United States Patent
Ito et al.

(10) Patent No.: US 6,647,772 B2
(45) Date of Patent: Nov. 18, 2003

(54) TRANSMITTER OF TIRE CONDITION MONITORING APPARATUS AND METHOD FOR MANUFACTURING TRANSMITTER OF TIRE CONDITION MONITORING APPARATUS

(75) Inventors: Yoshitaka Ito, Ogaki (JP); Setsuhiro Saheki, Ogaki (JP); Youichi Okubo, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 0 days.

(21) Appl. No.: 10/175,727

(22) Filed: Jun. 20, 2002

(65) Prior Publication Data

US 2003/0000297 A1 Jan. 2, 2003

(30) Foreign Application Priority Data

Jun. 28, 2001 (JP) .......................... 2001-195850
Jun. 3, 2002 (JP) .......................... 2002-161158

(51) Int. Cl.⁷ .............................................. G01M 17/02
(52) U.S. Cl. ................................... 73/146; 340/442
(58) Field of Search ............................. 73/146, 146.2, 73/146.3, 146.4, 146.5, 146.8

(56) References Cited

U.S. PATENT DOCUMENTS

| 4,816,802 A | * | 3/1989 | Doerksen et al. ............ 340/447 |
| 5,844,131 A | * | 12/1998 | Gabelmann et al. ........ 73/146.8 |
| 6,160,474 A | * | 12/2000 | Tsunetomi et al. .......... 340/442 |
| 6,351,990 B1 | * | 3/2002 | McInnes ..................... 73/146.8 |
| 6,450,021 B1 | * | 9/2002 | Katou et al. ................ 73/146.5 |

FOREIGN PATENT DOCUMENTS

JP     2000-025430     1/2000     ........... B60C/23/02

\* cited by examiner

Primary Examiner—Edward Lefkowtiz
Assistant Examiner—Andre Allen
(74) Attorney, Agent, or Firm—Marsh Fischmann & Breyfogle LLP

(57) ABSTRACT

A transmitter of a tire condition monitoring apparatus that has a superior moisture resistant characteristic, enables reduction in size, and facilitates manufacturing. The transmitter includes a casing formed from resin. An electric circuit unit is arranged in the casing to detect the condition of the tire and generate a signal corresponding to the condition of the tire. A battery is arranged in the casing to supply the electric circuit unit with power. The casing is insert molded to embed the electric circuit unit and the battery in the resin forming the casing.

17 Claims, 3 Drawing Sheets

TRANSMITTER OF TIRE CONDITION MONITORING APPARATUS AND METHOD FOR MANUFACTURING TRANSMITTER OF TIRE CONDITION MONITORING APPARATUS

BACKGROUND OF THE INVENTION

The present invention relates to a transmitter of a tire condition monitoring apparatus and a method for manufacturing a transmitter of a tire condition monitoring apparatus.

A wireless tire condition monitoring apparatus has been proposed in the prior art to enable a driver to check the condition of the vehicles tires from the passenger compartment. Such a monitoring apparatus includes a transmitter, which is arranged in each tire and attached to the associated wheel, and a receiver, which is arranged on the body of the vehicle. Each transmitter detects the condition of the associated tire, that is, the interior air pressure of the tire and the interior temperature of the tire. The transmitter then sends a signal, which indicates the detected tire condition, to the receiver by means of wireless transmission.

FIGS. 5 and 6 show a prior art transmitter 1, which is described in Japanese Laid-Open Patent Publication No. 2000-25430. The transmitter 1 includes a valve stem 3, which incorporates a valve core 2, and a resin casing 4. The basal end of the valve stem 3 is formed integrally with the casing 4 when the casing 4 is formed. The casing 4 has an air conduit 12, which is connected with an internal air passage that extends through the valve stem 3. When filling the tire with air, the air enters the tire from the valve core 2 through the internal air passage of the valve stem 3 and the air conduit 12.

The casing 4 accommodates an electric circuit unit 5 and a battery 8, which supplies the electric circuit unit 5 with power. A pair of conductive plates 13 connect the battery 8 to the electric circuit unit 5. The electric circuit unit 5 includes a circuit substrate 6 and electric devices 14, such as a pressure sensor and a signal processor, which are connected to the circuit substrate 6. The electric devices 14 are shown schematically in FIG. 6. Three bosses 7 are formed in the casing 4. The circuit substrate 6 has holes corresponding to the bosses 7. The bosses 7 are inserted into the holes and heated. This melts the ends of the bosses 7 and fixes the electric circuit unit 5 in the casing 4. The casing 4 has an opening, which is closed by a cover 10.

When assembling the transmitter 1, the electric circuit unit 5 and the battery 8 are first arranged at a predetermined position in the casing 4, and the electric circuit unit 5 is fixed to the bosses 7. Then, the casing 4 is charged with a potting agent 9. This envelops the electric circuit unit 5 and the battery 8 in the potting agent 9. The potting agent 9 protects the electric circuit unit 5 and the battery 8 from moisture. Finally, the opening of the casing 4 is sealed by the cover 10. An aperture 11 extends through the cover 10 to communicate the interior pressure of the tire to the pressure sensor of the electric circuit unit 5.

As described above, to manufacture the transmitter 1, the electric circuit unit 5 and the battery 8 are first arranged in the casing 4, the electric circuit unit 5 is then fixed to the bosses 7, the casing 4 is charged with the potting agent 9, and the cover 10 is finally attached to the casing 4. Accordingly, many operations are required to manufacture the transmitter 1. Further, since the bosses 7 must be provided in the casing 4 to fix the electric circuit unit 5, the structure of the casing 4 is complicated. This makes it difficult to reduce the size of the transmitter 1. In addition, equipment for charging the potting agent 9 is necessary, and time is required for the potting agent 9 to harden. This makes the manufacturing of the transmitter 1 burdensome and increases manufacturing costs.

SUMMARY OF THE INVENTION

It is an object to provide a transmitter of a tire condition monitoring apparatus that has a superior moisture resistant characteristic, enables reduction in size, and facilitates manufacturing, and a method for manufacturing such transmitter.

To achieve the above object, the present invention provides a transmitter of an apparatus for monitoring a condition of a vehicle tire. The transmitter includes a casing formed from resin. An electric circuit unit is arranged in the casing to detect the condition of the tire and generate a signal corresponding to the condition of the tire. A battery is arranged in the casing to supply the electric circuit unit with power. The casing is insert molded to embed the electric circuit unit and the battery in the resin forming the casing.

A further perspective of the present invention is a method for manufacturing a transmitter of an apparatus for monitoring a condition of a vehicle tire. The method includes arranging an electric circuit unit, which detects the condition of the tire and generates a signal in accordance with the detected tire condition, and a battery, which supplies the electric circuit unit with power, in a mold. The method also includes insert molding the casing by charging the mold with molten resin to envelop the electric circuit unit and the battery in the resin.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A preferred embodiment of the present invention will now be discussed with reference to FIGS. 1 to 3.

Figure 1:
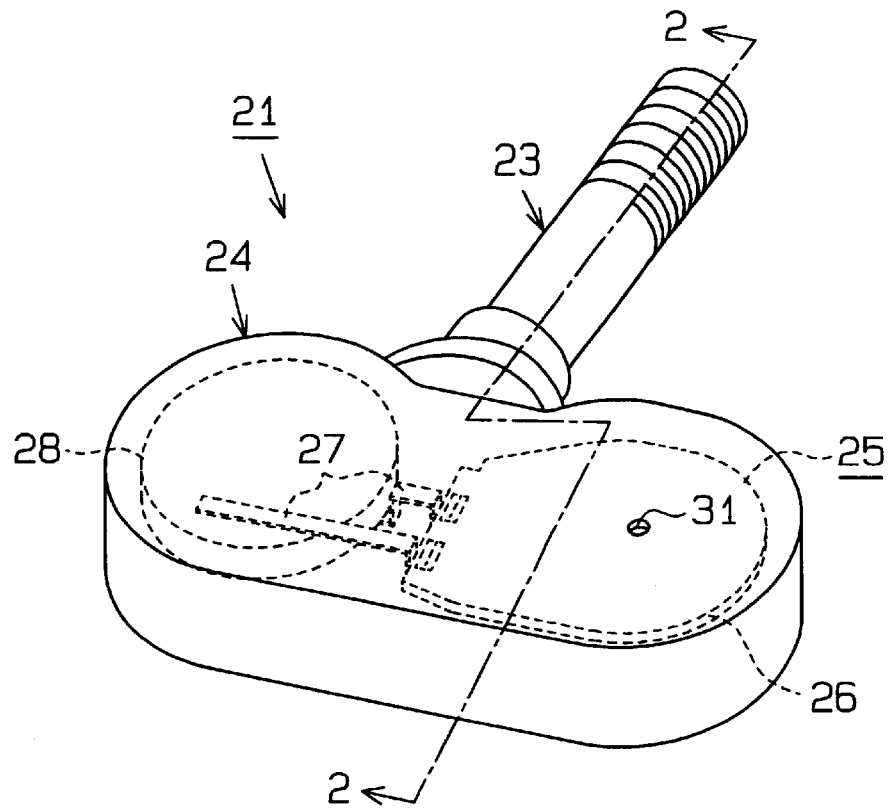
FIG. 1 is a perspective view showing a transmitter of a tire condition monitoring apparatus according to a preferred embodiment of the present invention.
Figure 2:
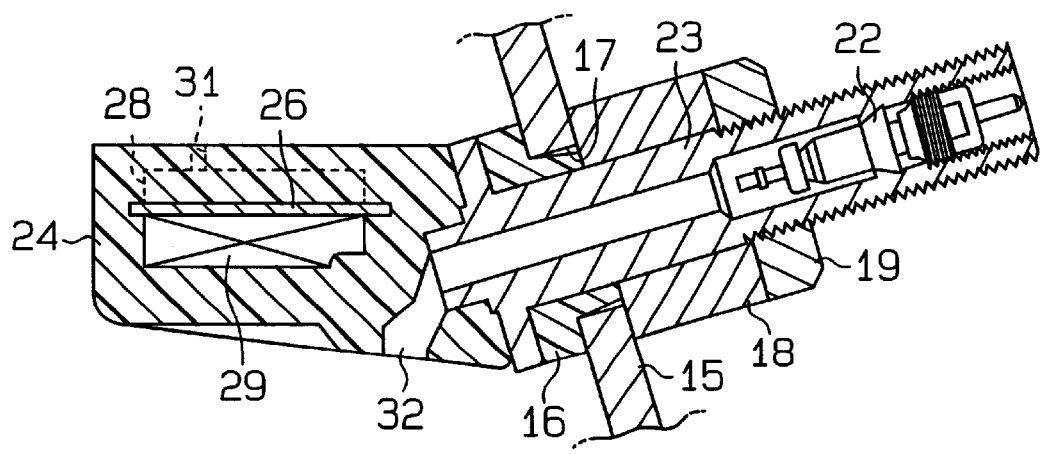
FIG. 2 is a cross-sectional view taken along line 2—2 in FIG. 1.

A tire condition monitoring apparatus includes a transmitter 21, which is shown in FIGS. 1 and 2, and a receiver (not shown), which is arranged on a body of the vehicle. Referring to FIG. 2, the transmitter 21 is attached to a wheel 15 in each tire. The transmitter 21 detects the condition of the associated tire, that is, the interior air pressure of the tire and the interior temperature of the tire. The transmitter 21 then sends a signal, which indicates the detected tire condition, to the receiver by means of wireless transmission. The receiver receives the signal and shows information related with the tire condition on a display, which is arranged in the passenger compartment.

As shown in FIGS. 1 and 2, the transmitter 21 includes a resin casing 24 and a valve stem 23, which extends through the wheel 15 from the casing 24 and out of the tire. A bushing 16, which is made of rubber or resin, is fixed to the basal end of the valve stem 23. The bushing 16 is fitted in a valve hole 17, which is formed in the wheel 15. A nut 19 is coupled to the valve stem 23 to fasten the wheel 15 between the bushing 16 and a collar 18. This fixes the transmitter 21 to the wheel 15.

The valve stem 23 has an interior air passage. The valve core 22 is arranged in the interior air passage near the distal end of the valve stem 23. The casing 24 has an air conduit 32, which is connected with the interior air passage of the valve stem 23. When filling the tire with air, the air enters the tire from the valve core 22 through the internal air passage of the valve stem 23 and the air conduit 32.

The casing 24 accommodates an electric circuit unit 25 and a battery 28, which supplies the electric circuit unit 25 with power. A pair of conductive plates 27 connect the battery 28 to the electric circuit unit 25. The electric circuit unit 25 includes a circuit substrate 26 and electric devices 29, such as a pressure sensor and a signal processor, which are connected to the circuit substrate 26. The electric circuit unit 25 detects the condition of the tire and generates a signal indicating the detected tire condition. An aperture 31 extends through the casing 24 to communicate the interior pressure of the tire to the pressure sensor of the electric circuit unit 25.

The casing 24 is injection molded. More specifically, the basal end of the valve stem 23, the electric circuit unit 25, and the battery 28 are arranged as inserts in a mold, which is used to form the casing 24. In this condition, the mold is charged with molten resin to envelop the inserts in the resin. When the resin hardens, the casing 24 is formed integrally with the inserts. Accordingly, in the preferred embodiment, the casing 24 is insert molded to embed the electric circuit unit 25 and the battery 28 in the resin, which forms the casing 24.

Figure 3:
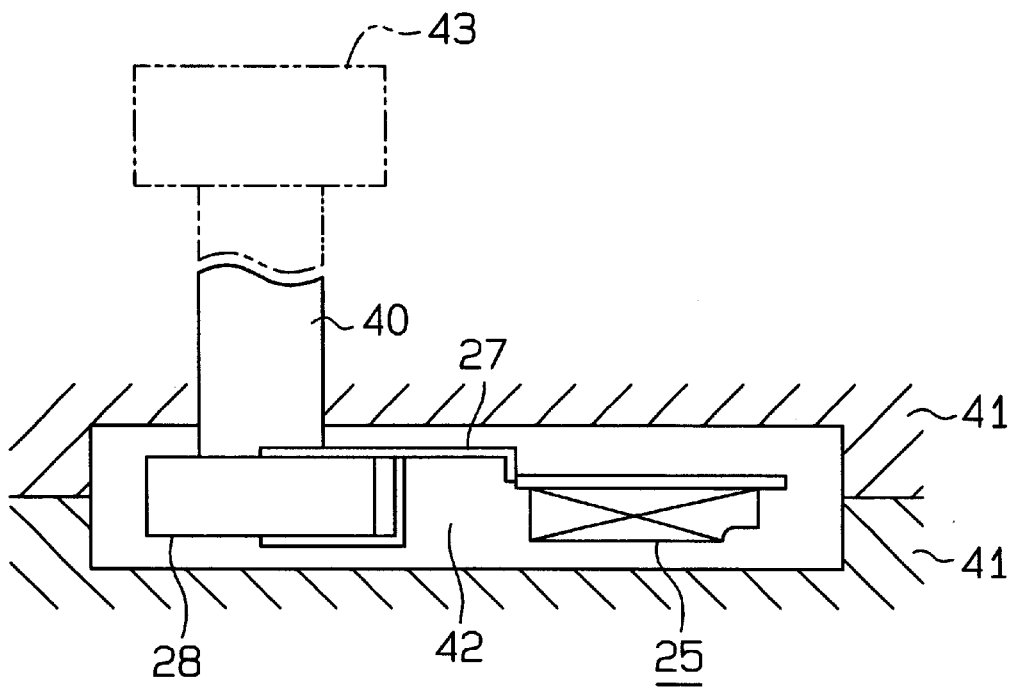
FIG. 3 is a cross-sectional view illustrating insert molding of a casing.

To perform insert molding, for example, the inserts, or the electric circuit unit 25 and the battery 28, are arranged in a cavity 42 of a mold 41, as shown in FIG. 3. The battery 28 is supported and connected to the electric circuit unit 25 by the conductive plates 27. Although not shown in FIG. 3, the basal end of the valve stem 23, which is an insert, is also arranged in the cavity 42. A support pin 40, which serves as a support, is inserted in the cavity 42 to hold the electric circuit unit 25 and the battery 28 at a predetermined position in the cavity 42.

In this state, molten resin is injected into the cavity 42 to envelop the inserts in the resin. The support pin 40 is removed from the cavity 42 just before the injection of resin is completed. The casing 24, which is formed integrally with the basal end of the valve stem 23, the electric circuit unit 25, and the battery 28, is completed when the resin hardens.

The support pin 40 may be employed as a cooling pin by connecting the support pin 40 to a cooling device 43. In this case, the support pin 40 contacts the battery 28 when supporting the battery 28. When the molten resin, which temperature is relatively high, is injected into the cavity 42, the support pin 40 cools the battery 28. This prevents the performance of the battery 28 from being affected by heat.

The preferred embodiment has the advantages described below.

Figure 5:
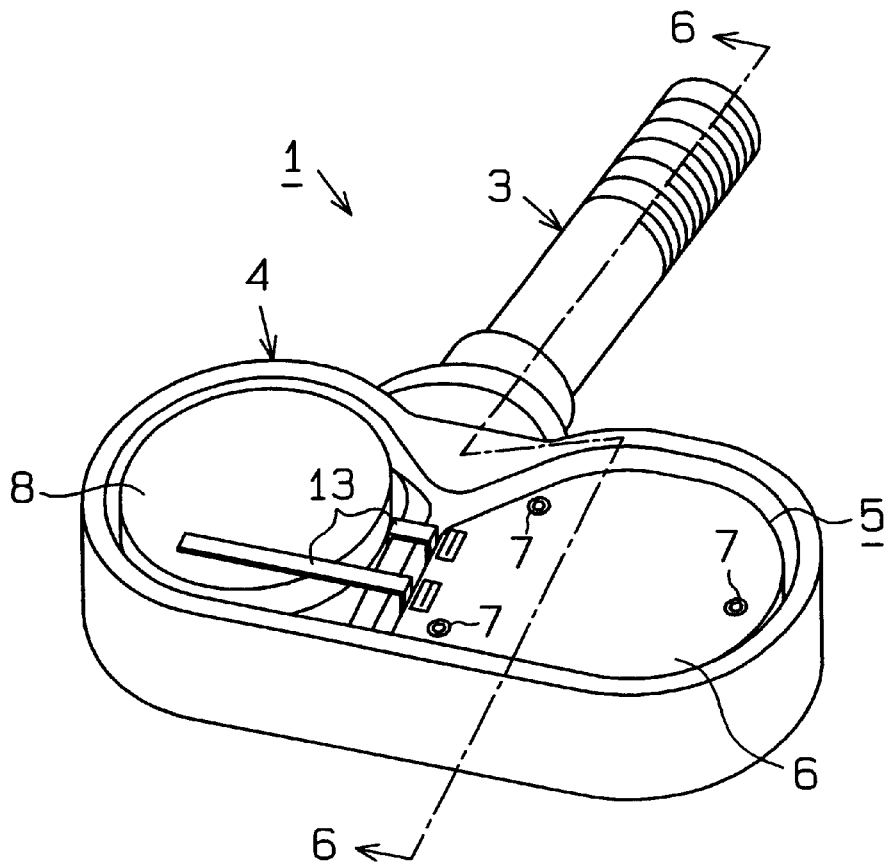
FIG. 5 is a perspective view showing a prior art transmitter of a tire condition monitoring apparatus.
Figure 6:
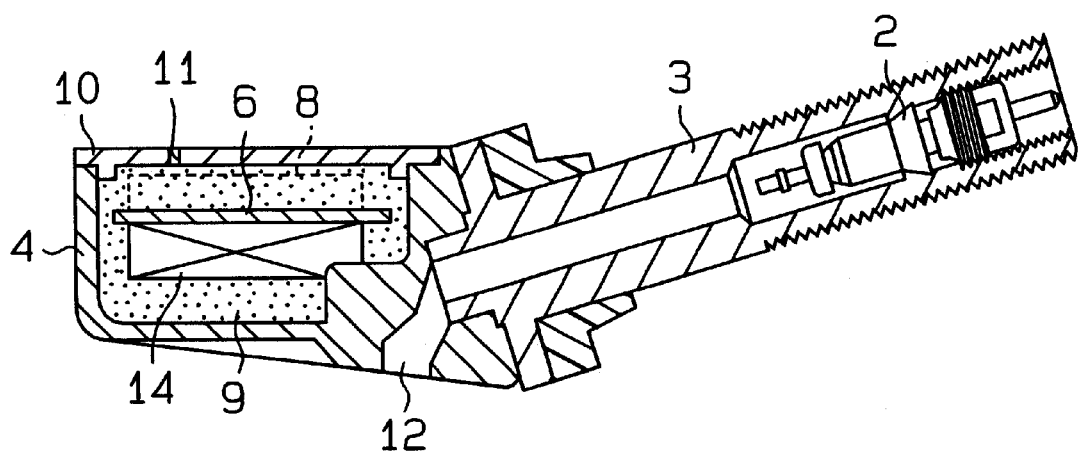
FIG. 6 is a cross-sectional view taken along line 6—6 in FIG. 5.

The casing 24 is insert molded to embed the basal end of the valve stem 23, the electric circuit unit 25, and the battery 28 in the resin that forms the casing 24. In other words, the electric circuit unit 25 and the battery 28 are connected to the casing 24 when forming the casing 24. Thus, the connecting of the electric circuit unit 25 and the battery 28 to the casing 24 and the formation of the casing 24 are not performed separately. Further, the electric circuit unit 25 and the battery 28 are embedded in the resin that forms the casing 24. Thus, the electric circuit unit 25 and the battery 28 do not have to be enveloped in a potting agent. Accordingly, in comparison with the prior art shown in FIGS. 5 and 6, the manufacturing of the transmitter 21 is facilitated. Further, the time required for manufacturing the transmitter 21 is reduced, and the cost for manufacturing the transmitter 21 is decreased. In addition, a structure for fixing the battery 28 and the electric circuit unit 25 in the casing 24 like in the prior art is not necessary. This enables the size of the transmitter 21 to be reduced.

The electric circuit unit 25 and the battery 28 are directly enveloped in the resin that forms the casing 24. Thus, the transmitter 21 has a superior moisture resistance characteristic.

Figure 4:
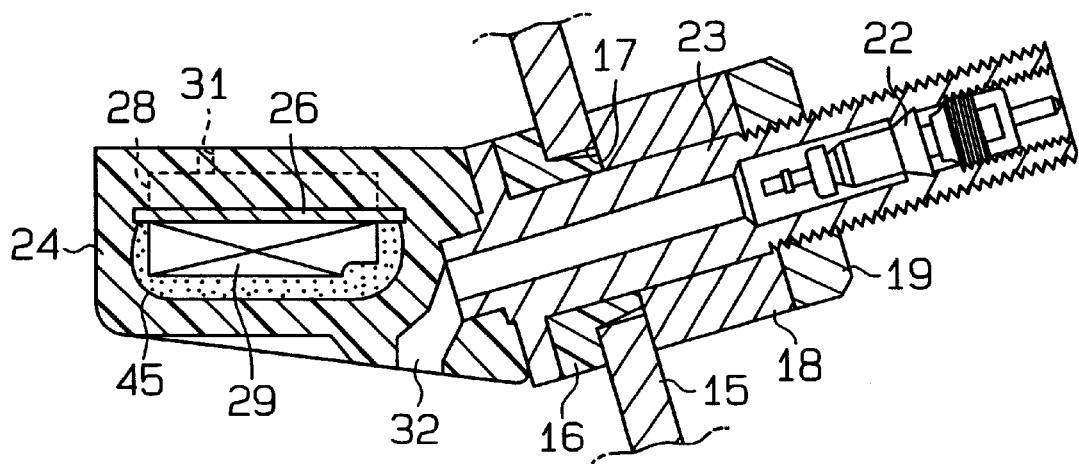
FIG. 4 is a cross-sectional view showing a transmitter according to a further embodiment of the present invention.

Referring to FIG. 4, in a further embodiment according to the present invention, the electric devices 29, which are connected to the circuit substrate 26, are enveloped in a damping material (stress absorbing material) 45, which has a relatively low hardness. A material that is softer than the resin, which forms the casing 24, and absorbs stress acting on the casing 24 in a satisfactory manner is used as the damping material 45. Such a material may be an elastic body, such as rubber, or a viscous elastic body, such as silicone gel. It is especially preferred that silicone gel be used since silicone gel has a superior heat resistant property and superior vibration and impact absorbing properties. Further, silicone gel has a superior adhesive property relative to the electric devices 29 in the circuit substrate 26.

In a state in which the electric devices 29 are enveloped in the damping material 45, the insert molding of the casing 24 is performed in the same manner as in the embodiment of FIGS. 1 to 3.

The damping material 45, which protect the electric devices 29, absorb stress acting on the casing 24 and prevents the stress from acting on the electric devices 29. This improves the operational reliability of the transmitter 21.

It should be apparent to those skilled in the art that the present invention may be embodied in many other specific forms without departing from the spirit or scope of the invention. Particularly, it should be understood that the present invention may be embodied in the following forms.

When insert molding the casing 24 and employing the support pin 40 as a cooling pin, the support pin 40 may support the electric circuit unit 25. In this case, the support pin 40 cools the electric circuit unit 25 to prevent the heat of the injected molten resin from affecting the performance of the electric devices 29.

The casing 24 may be insert molded with part of the electric circuit unit 25 or part of the battery 28 exposed from the casing 24.

The present examples and embodiments are to be considered as illustrative and not restrictive, and the invention is not to be limited to the details given herein, but may be modified within the scope and equivalence of the appended claims.

What is claimed is:

1. A transmitter of an apparatus for monitoring a condition of a vehicle tire, the transmitter comprising:

a casing formed from resin;

an electric circuit unit arranged in the casing to detect the condition of the tire and generate a signal corresponding to the condition of the tire; and a battery arranged in the casing to supply the electric circuit unit with power, wherein the electric circuit unit and the battery are inserts, and the casing is insert molded to embed the electric circuit unit and the battery in the resin forming the casing.

2. The transmitter according to claim 1, further comprising a valve stem extending from the casing, wherein the valve stem has a basal end that is embedded in the resin forming the casing when the casing is insert molded.

3. The transmitter according to claim 1, wherein the electric circuit unit includes an electric device, the electric device being enveloped in a damping material that absorbs stress acting on the casing.

4. The transmitter according to claim 3, wherein the damping materials is softer than the resin that forms the casing.

5. The transmitter according to claim 3, wherein the damping material is silicone gel.

6. The transmitter according to claim 3, wherein the damping material is rubber.

7. A method for manufacturing a transmitter of an apparatus for monitoring a condition of a vehicle tire, the method comprising the steps of:

arranging an electric circuit unit, which detects the condition of the tire and generates a signal in accordance with the detected tire condition, and a battery, which supplies the electric circuit unit with power, in a mold as inserts; and insert molding the casing by charging the mold with molten resin to envelop the electric circuit unit and the battery in the resin.

8. The method according to claim 7, further comprising the step of cooling the battery when insert molding the casing.

9. The method according to claim 8, wherein the step of cooling the battery includes supporting the battery with a cooling pin.

10. The method according to claim 7, further comprising the step of cooling the electric circuit unit when insert molding the casing.

11. The method according to claim 10, wherein the step of cooling the electric circuit unit includes supporting the electric circuit unit with a cooling pin.

12. A transmitter of an apparatus for monitoring a condition of a vehicle tire, the transmitter comprising:

a valve stem extending out of the tire;

a bushing fixed to the valve stem and attached to a wheel of the tire;

a collar arranged on the valve stem;

a nut coupled to the valve stem to fasten the wheel between the bushing and the collar;

a casing formed from resin;

an electric circuit unit arranged in the casing to detect the condition of the tire and generate a signal corresponding to the condition of the tire; and a battery arranged in the casing to supply the electric circuit unit with power, wherein the electric circuit unit and the battery are inserts, and the casing is insert molded to embed the electric circuit unit and the battery in the resin forming the casing.

13. The transmitter according to claim 12, wherein the valve stem has a basal end that is embedded in the resin forming the casing when the casing is insert molded.

14. The transmitter according to claim 12, wherein the electric circuit unit includes an electric device, the electric device being enveloped in a damping material that absorbs stress acting on the casing.

15. The transmitter according to claim 14, wherein the damping material is softer than the resin that forms the casing.

16. The transmitter according to claim 14, wherein the damping material is silicone gel.

17. The transmitter according to claim 14, wherein the damping material is rubber.

* * * * *